No. 782,549. PATENTED FEB. 14, 1905.
J. M. DOVE, J. S. BANCROFT & M. C. INDAHL.
DIE CASE TRANSPOSING MECHANISM FOR TYPE MACHINES.
APPLICATION FILED MAY 28, 1904.

No. 782,549. PATENTED FEB. 14, 1905.
J. M. DOVE, J. S. BANCROFT & M. C. INDAHL.
DIE CASE TRANSPOSING MECHANISM FOR TYPE MACHINES.
APPLICATION FILED MAY 28, 1904.

No. 782,549. PATENTED FEB. 14, 1905.
J. M. DOVE, J. S. BANCROFT & M. C. INDAHL.
DIE CASE TRANSPOSING MECHANISM FOR TYPE MACHINES.
APPLICATION FILED MAY 28, 1904.

Witnesses
Inventors
John M. Dove
John S. Bancroft
Mauritz C. Indahl
By Church & Church
their Attorneys No. 782,549. Patented February 14, 1905.

UNITED STATES PATENT OFFICE.

JOHN MAURY DOVE, OF WASHINGTON, DISTRICT OF COLUMBIA, AND JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

DIE-CASE-TRANSPOSING MECHANISM FOR TYPE-MACHINES.

SPECIFICATION forming part of Letters Patent No. 782,549, dated February 14, 1905.

Application filed May 28, 1904. Serial No. 210,270.

*To all whom it may concern:*

Be it known that we, JOHN MAURY DOVE, residing at Washington, in the District of Columbia, and JOHN SELLERS BANCROFT and MAURITZ C. INDAHL, residing at Philadelphia, in the county of Philadelphia and State of Pennsylvania, citizens of the United States, have invented certain new and useful Improvements in Die-Case-Transposing Mechanism for Type-Machines; and we do hereby declare the following to be a full, clear, and exact description of the same, reference being had to the accompanying drawings, forming a part of this specification, and to the figures of reference marked thereon.

This invention relates to that class of type-machines in which a die-case equipped with a plurality of matrices is adjusted by a centering mechanism to bring any desired matrix opposite the mold, as in the type casting and composing machines of the Monotype and analogous systems.

Theoretically the number of matrices contained in the die-case and the degree of motion incident thereto are unlimited; but practically it is quite different, for here one of the prime requisites is speed of production which is antagonized and successfully overcome by the ever present inertia when certain dimensions are exceeded. Hence in striking a balance it has been found necessary to restrict the capacity of the machine, as represented by the number of available characters or matrices, within somewhat narrow limits, in order to attain the requisite speed of production and at the same time maintain the quality up to the standard. In other words, capacity is subordinated to speed and quality, in so far as the automatic action of the machine is concerned, and when it is desired to produce characters other than those represented by the matrices of the die-case with which the machine is at the time equipped the die-case must be removed and its matrices replaced by others containing the desired characters, or, what is more usual, another die-case substituted. Heretofore the substitution or interchange of die-cases has been effected manually by the operator at the casting-machine, involving a considerable loss of time both at the casting-machine and the keyboard; but the most serious defects are those incident to the fact that the changes from one set of matrices to another are not within the immediate control of the person responsible for the matter turned out—that is, the compositor who prepares the record-strip which governs the automatic action of the casting-machine.

Now the primary objects of the present invention are to increase the capacity of the casting-machine with respect to the number of characters or matrices automatically controlled thereby without imposing additional burdens upon the translating or adjusting devices, such as would interfere with the speed of production, and to materially enlarge the control exercised by the compositor of the record-strip over the product of the casting-machine; to which ends the said invention consists, broadly, in the use of an automatic die-case-transposing mechanism for effecting an interchange of die-cases with the centering mechanism or translating devices of the casting-machine, in the use of the record-strip for controlling the actions of said transposing mechanism, and in certain novel constructions, combinations, and arrangements of parts, all as hereinafter fully described, and the novel features pointed out in the claims.

In the accompanying drawings, illustrating a preferred form of embodiment of the invention.

The same numerals designate like parts in the several figures.

The type-casting machine illustrated in part is essentially that of Patent No. 625,998, to which latter reference may be had for the details of construction and mode of operation, as only those parts with which the new attachment has direct connection are shown—such as the main frame 1, the paper-feed 2, the mold 3, the bridge 4, in which are mounted the vertically-movable supporting-frame 5 for the die-case carrier 6, the centering-pin 7, the actuating-lever 8 for the die-case-supporting frame, the centering-pin lever 9, the die-case-centering mechanism 10, the main driving-shaft 11, the perforated record-strip 12, and the die-case 13. As contributing to a clearer and more ready understanding of the attachment it may here be remarked that the centering mechanism 10 includes two adjusting or positioning systems independently controlled from the record-strip and acting the one upon the die-case 13 and the other upon the die-case carrier 6 to center any matrix above the mold by a two-way movement of the die-case, to which end the latter is mounted to reciprocate upon its carrier in a direction at right angles to the movement of the carrier upon the supporting-frame 5. The die-case is detachably connected to its section of the centering mechanism, as by being provided with a recess 15, Fig. 15, to receive bar 16, Fig. 12, on the centering mechanism, so that by elevating the supporting-frame 5 above its normal or working position the die-case will be uncoupled and can be withdrawn or inserted, as desired. The centering-pin lever 9 is so coupled with the centering-pin 7 and the die-case-supporting frame that upon the descent of said lever the supporting-frame, and with it the die-case, will be depressed to seat the selected matrix upon the mold, the centering-pin advancing to finally center the selected matrix and hold it firmly in contact with the mold while the cast is being made.

In the preferred form of embodiment herein illustrated the automatic die-case-transferring attachment occupies a position on the front side of the machine above the galley mechanism and comprises a magazine or die-case holder for accommodating a plurality of die-cases, a selective mechanism for presenting the die-cases in position to enter the die-case carrier, automatic means for uncoupling and coupling the die-case and its centering-mechanism, translating devices for moving the selected die-case into and withdrawing the same from the carrier, and a starting mechanism together with other features contributing to the end in view, as will presently appear.

Figure 3:
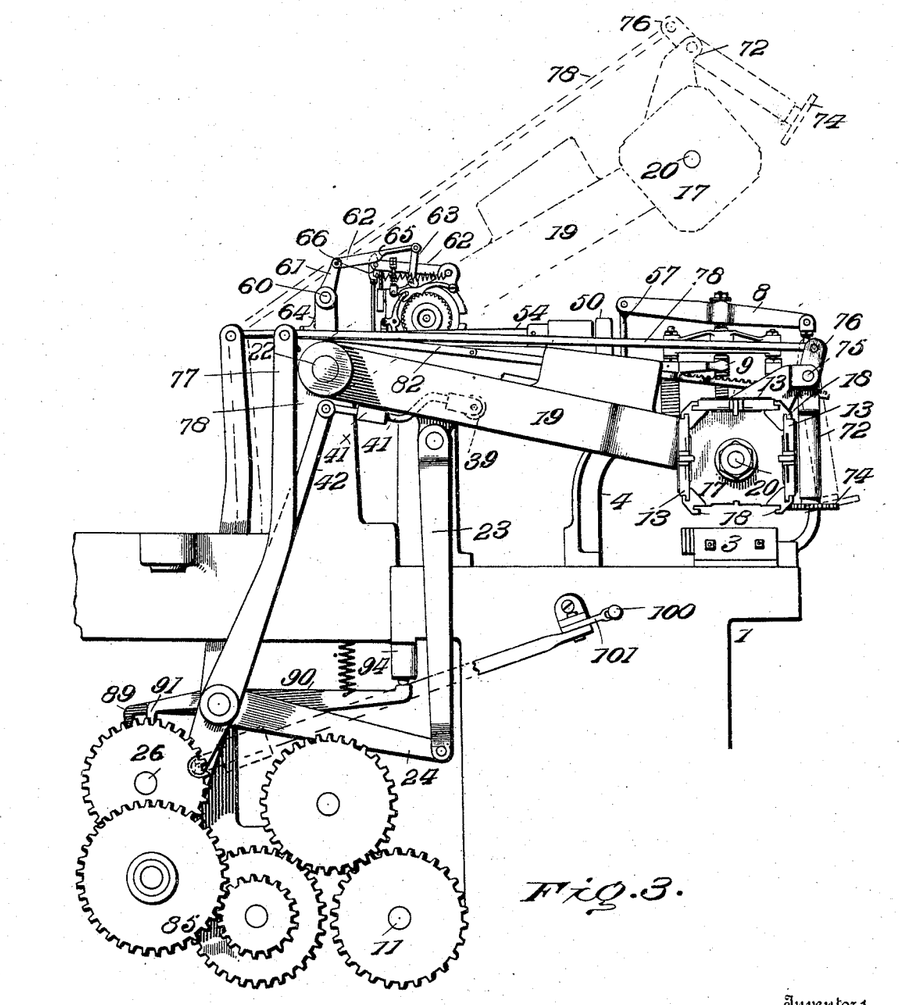
Fig. 3 is an end view of the attachment, showing also the connection with the paper-feed.
Figures 8, 9, 10, 11:
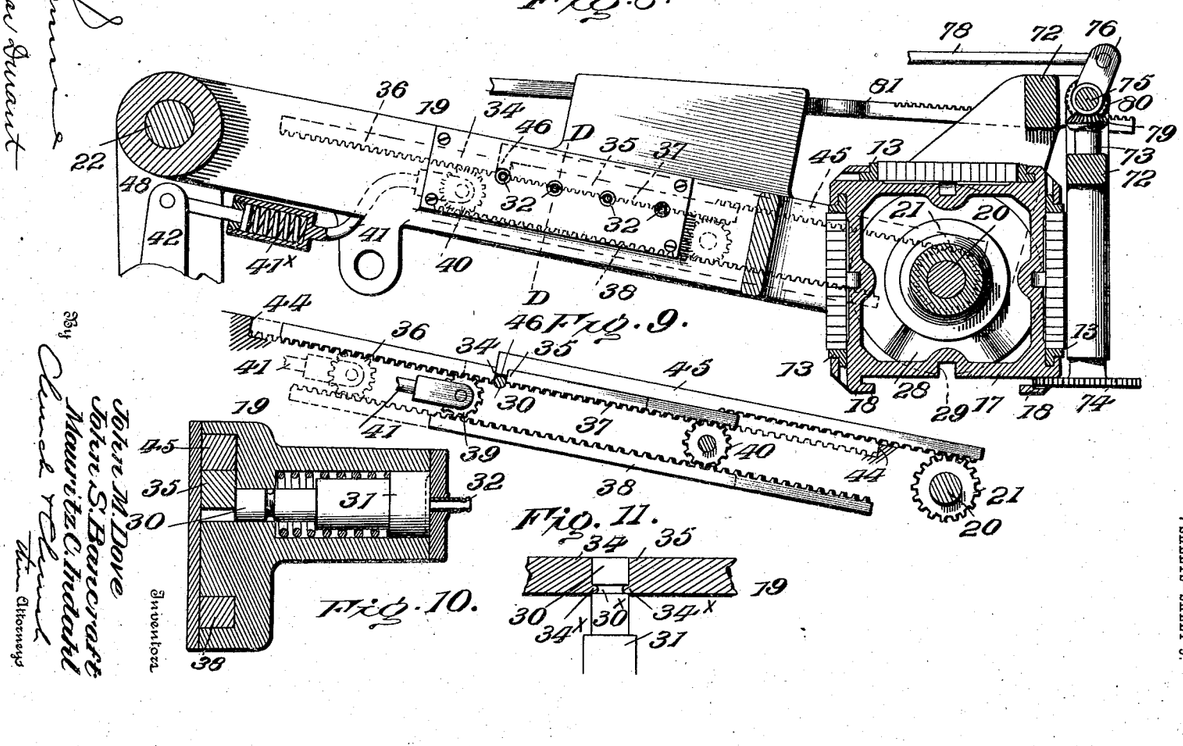
Fig. 8 is a partial vertical section on the line C C of Fig. 2, showing the die-case magazine and the controllable devices for shifting the same.
Fig. 9 is a diagrammatic view of the mechanism controlling the shift of the die-case magazine.
Fig. 10 is a section on the line D D, Fig. 8, showing one of the gage-pins, its cylinder, and piston.
Fig. 11 is a detail showing gage-retaining devices on the jaws.
Figure 12:
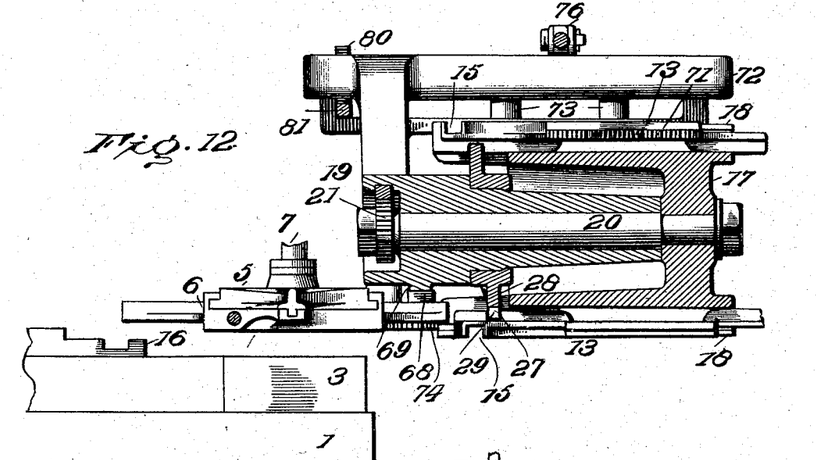
Fig. 12 is a longitudinal section through the die-case magazine.
Figures 13, 14, 15:
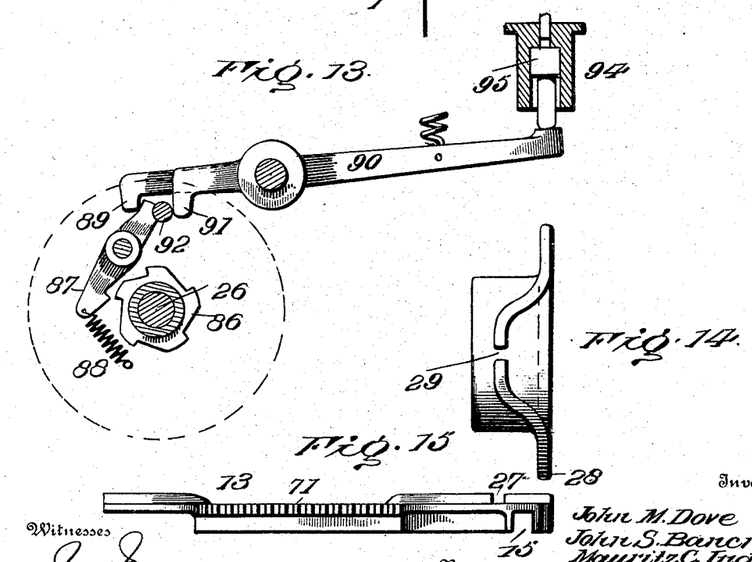
Fig. 13 is a detail view of the starting devices for the transposing mechanism.
Fig. 14 is a detail view of the cam for locking and shifting the die-cases in the magazine.
Fig. 15 is a side elevation of the die-case.

The magazine or holder is represented as a turret or head 17, Figs. 3, 8, and 12, preferably polygonal in section and provided with a series of parallel sets of guides 18, forming receptacles for supporting the die-cases. This head 17 is revolubly supported on the outer end of a frame 19, as by being attached to a shaft 20, mounted in a bearing on said frame and provided with a pinion 21, through which motion is communicated to the head. The frame 19 is pivotally supported at its inner end on a shaft 22 in line with or constituting a prolongation of the axis of centering-pin lever 9, and it is coupled by a link 23 to an actuating-lever 24, engaged by a cam 25, loose on shaft 26, through which motion is transmitted to said frame for elevating and depressing the magazine. Each die-case is furnished with a notch 27, Fig. 15, in its central guide for receiving a circumferential projection or flange 28, surrounding the bearing for shaft 20, said projection being provided with a gate, as at 29, opposite the point at which the die-cases are received or discharged to permit the passage of the central guide, so that when a die-case has been inserted in the head and as the latter is revolved or oscillated the flange 28 will enter its notch 29, and thus lock the die-case in position and prevent accidental displacement. As a matter of accommodation for other parts of the machine and to insure the proper presentation of the die-case to the translating mechanism when brought into position to be transferred to the die-case carrier it has been found desirable that the die-cases should be shifted slightly during the rotation of the magazine, and as they approach toward and depart from the gate 29, to which end the flange 28 is deflected to one side in the immediate vicinity of the gate, as illustrated in Fig. 14, wherein said flange and its sleeve are shown in reversed position to correspond with that of the die-case, Fig. 15.

The selective mechanism controlling the magazine and the presentation of the die-cases in position to be transferred to the die-case carrier of the casting-machine is represented in the present instance by a series of gage or stop pins 30, Figs. 8, 10, and 11, one for each die-case, governed by special perforations or signals in the record-strip and operating in conjunction with the magazine-shifting mechanism to determine the extent of motion to be imparted to the magazine. Hence the positions assumed by its receptacles or guides 18 relative to those of the die-case carrier and also as a locking means for holding the magazine 17 in adjusted position during certain intervals, as will presently appear. In the illustration the head 17, rectangular in section, is equipped with four sets of guides 18. Hence four gages 30 are employed, each corresponding with one set of guides 18, and as according to this arrangement said guides are arranged at equidistant points about the circumference of the head the gages occupy corresponding positions—that is, they are serially arranged at equal distances apart. Each gage is attached to a piston 31, the latter working in a cylinder in the frame 19 and provided with a retracting-spring and an inlet 32, the latter communicating with a port 33, Fig. 16, of the paper-feed mechanism. Supported to reciprocate longitudinally in guides on frame 19 in a plane parallel with the series of gages 30 are two oppositely-movable jaws 34 35, adapted to engage and close upon any one of the gages 30 when the latter is projected into their path.

The means devised for actuating jaws 34 35 in relatively opposite directions to open for receiving a gage and to close upon the latter irrespective of the position it occupies within the range of their movement includes two rack-bars 36 37, one for each jaw, and preferably formed integral therewith; a longitudinally-movable rack-bar 38, supported in guides on frame 19, parallel with rack-bars 36 37, and two pinions 39 40, each engaging one of the rack-bars 36 37 and both engaging rack-bar 38. Pinion 40 is mounted to rotate in or on bearings fixed to frame 19, while pinion 39 is carried by a link 41, provided with a spring compression box or coupling $41^\times$ and attached to an actuating-lever 42, the latter engaging a cam 43, loose on shaft 26. When the jaws are open or separated, as indicated by dotted lines, Fig. 9, to permit a gage 30 to be set, pinion 39 occupies an extreme position remote from pinion 40, with the rack-bars 36 37 in engagement with fixed abutments 44 on the frame. If now pinion 39 is moved a definite distance toward pinion 40, it will transmit motion in opposite directions to the jaws until one of them is arrested by contact with the gage, after which the opposite jaw will be advanced until arrested by contact with the stationary jaw on the opposite side of the gage. During this action the jaws may advance successively or simultaneously, depending upon their relative resistance. Thus if the resistance of jaw 35 is in excess rack-bar 38 will remain stationary when pinion 39 begins its motion. By virtue of its contact with rack-bar 38 the upper portion of pinion 39 will be rotated in the direction of its bodily movement and the jaw 34 will be advanced until it contacts with the projected gage 30, thereby arresting the further motion of rack-bar 36, whereupon the latter will replace rack 38 as the fixed member for effecting the rotation of pinion 39, and as said pinion continues its advance rack-bar 38 will be moved in the same direction and acting through pinion 40 will cause jaw 35 to approach and close upon the gage 30. Should the resistance of jaw 34 be in excess, its rack-bar 36 will remain at rest while pinion 39 acts thereon to move rack-bar 38 and advance jaw 35 until it contacts with the gage, whereupon rack-bar 38 will be held in position while pinion 39 acts thereon to advance jaw 34. Each jaw 34 35 is permitted a range of motion somewhat in excess of the space occupied by the series of gages 30, and by the use of the rotary reciprocating pinion 39 in connection with the oppositely-disposed movable rack-bars the motion of the driving member or link 41 may be multiplied to such an extent that a comparatively short excursion of said link will suffice. One or both jaws 34 35 is furnished with a lip or projection $34^\times$, which enters a notch $30^\times$ in the stop-pin or gage 30, when the jaws close upon the latter to prevent the withdrawal of the gage until the jaws again open. To render this controllable gaging mechanism operative upon the revoluble magazine or head 17, a rack-bar 45, guided on frame 19 and engaging pinion 21, is furnished with a head or projection 46, occupying a position between and in the path of jaws 34 35, so that as they are operated in the manner described to close upon one of the gages 30 they will at the same time engage projection 46 and carry it directly to the position designated by the gage, thereby rotating head 17 to the required degree and in the proper direction to bring the die-case designated by the particular gage into position for transfer to the die-case carrier.

Figures 4, 5, 6, 7:
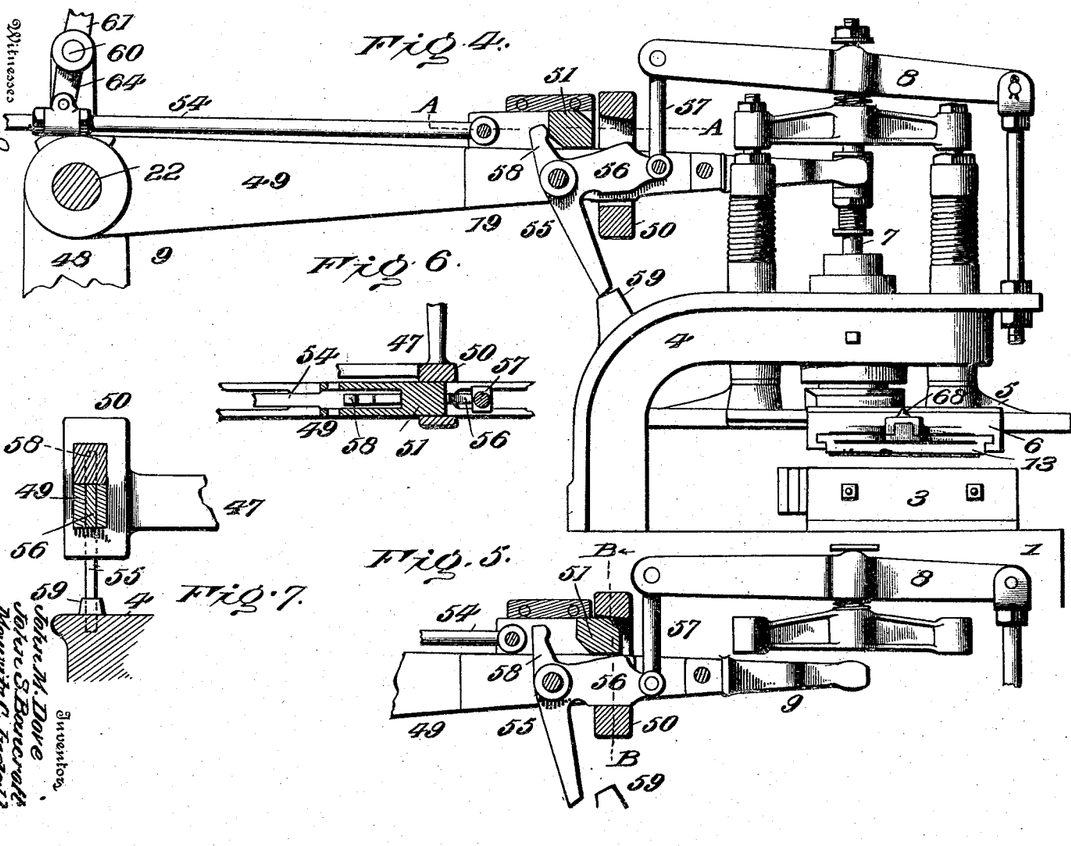
Fig. 4 is a side elevation, partly in section, of the mechanism for elevating the die-case-supporting frame to disengage the die-case from its translating devices or centering mechanism and to retract the centering-pin.
Fig. 5 is a detail view showing the lock for the actuating and centering pin levers.
Fig. 6 is a partial section on the line A A of Fig. 4.
Fig. 7 is a section on the line B B of Fig. 5.

The elevation and depression of the die-case-supporting frame 5 to permit the insertion and withdrawal of the die-case in its carrier 6 is effected through the medium of an extensible connection intermediate the actuating-lever 8 and the centering-pin lever 9 from which it receives motion. The lever 9 is formed in two parts, a driving-section 47, attached to the dependent member 48, upon which the actuating-cam operates, and a loosely-pivoted section 49, the latter extending through a slotted bearing 50 on section 47 and engaging the centering-pin. When the machine is in operative condition—that is, adjusted for casting type—the two sections 47 and 49 of lever 9 are locked together as one by the insertion of a block 51 within slotted bearing 50 above section 49, so that the two sections will operate as the integral lever of the prior machine. The block 51 is guided upon section 49 to reciprocate longitudinally thereof and is of proper dimensions to fill the interval between section 49 and the upper end of bearing 50 when section 49 is seated upon the lower end of said bearing, the front upper edge of the block being beveled to facilitate its entrance into the slot. The position and movements of block 51 are controlled by a cam 52, loose on shaft 26, acting through lever 53 and link 54. To section 49 of lever 9 is pivotally attached a three-armed member or lever 55, forming part of the extensible connection, with one arm, 56, extending through slotted bearing 50 and connected to the link 57 on the die-case-support lever 8, a second arm, 58, projecting upward in rear of block 51, and a third arm projecting downward in the plane of a supporting-surface 59 on the bridge 4. The maximum vertical dimension of arm 56 within the slotted bearing 50 corresponds with that of section 49, so that when block 51 is interposed the lever 55, as well as section 49, will be rigidly locked to section 47, as seen in Fig. 5; but when said block 51 is withdrawn from bearing 50 not only will section 49 and lever 8 be released, but owing to the engagement of block 51 with arm 58 lever 55 will be tilted to actuate lever 8 and engage surface 59, thereby elevating the supporting-frame 5 to uncouple the die-case from its centering mechanism and at the same time providing a support for section 49, connected to the centering-pin to prevent the latter from following the motion of section 47 as the latter reciprocates.

As the locking of the paper-feed-actuating devices accompanies the withdrawal of block 51 and is connected therewith it is appropriate that the means for effecting this action should be explained at this point. Upon the bearings or supports for lever 9 and above the latter is mounted a rock-shaft 60, Figs. 2, 3, and 4, carrying an arm 61, the latter coupled by a link 62 to the locking-lever 63 of the paper-feed mechanism. This lever 63 controls the holding-pawl of the paper-feeding devices and when turned in one direction locks the latter against movement by the feeding-pawl. Shaft 60 is also provided with an arm 64, engaging an adjustable coupling on the link 54, through which motion is communicated to block 51, the arrangement being such that when said block is withdrawn to elevate the die-case carrier the paper-feed will be locked out of action and so retained until the block is again advanced to couple the die-case with its centering mechanism and lock the two sections of lever 9 together, thus placing the machine in condition for casting. Link 62 is also utilized to hold the air-bar down and admit pressure to the exposed ports during the time the paper-feed is locked out, for which purpose it is provided with a beveled surface 65, which rides over the lifting-pin 66 on the air-bar lever 67.

It is while the die-case carrier occupies the position to which it is shifted by the withdrawal of block 51—that is, a position wherein the die-case is uncoupled from its centering mechanism—that registry is effected between its guides and the set of guides 18 of the magazine corresponding with and designated by the gage 30 at the time in action. Suitable means are provided for insuring accurate registry of the guides, as by providing the carrier with an inverted-V bearing 68 in position to receive a complementary bearing 69, carried by frame 19.

The translating mechanism operates to restore the die-case previously in use to its compartment in the magazine, and after the latter has been adjusted to transfer the selected die-case to the die-case carrier in position to be coupled with its centering mechanism when the mechanism of the casting-machine is restored to working condition. A sample mechanism of this kind is shown as mounted upon frame 19 and controlled by cams loose on shaft 26. The die-cases 13 are each provided with a series of rack-teeth 71 along one edge, and the frame 19 is equipped with a supplemental frame 72, supporting shafts 73, each of the latter carrying a wheel 74 for engaging the teeth on the die-case. One of each set of guides 18 is provided with lateral openings for the passage of the wheels 74, and the frame 72 is pivotally attached at its upper portion to a shaft 75, mounted in bearings on frame 19 and extending parallel with the axis of head 17. Frame 72 is furnished with an arm 76, and the latter is coupled with the actuating-lever 77, engaging cam 70 through a link 78, whereby said frame is oscillated to carry wheels 74 into engagement with the teeth on the die-case for moving the latter or to withdraw them therefrom for shifting the position of the magazine. Shaft 75 is connected to each of the shafts 73 through bevel-gears 79 and is furnished with a pinion 80, engaging the teeth of a rack-bar 81, connected by a link 82 to an actuating-lever 83, engaging a cam 84, loose on shaft 26. Cams 70 and 84 are so formed, proportioned, and arranged that when the magazine is elevated and until the frame 19 is lowered to bring a pair of guides 18 into alinement with those of the die-case carrier no motion will be transmitted to the parts connected therewith, the frame 72 being at the time so held that the wheels 74 are withdrawn from head 17 and the rack-bar 81 retracted. As soon, however, as the guides are brought into alinement, block 51 having in the meantime been withdrawn to elevate the die-case carrier, frame 72 is swung toward head 17, as shown in Fig. 8, and immediately thereafter rack-bar 81 is advanced to rotate wheels 74 in a direction to transfer a die-case from its carrier to the magazine. After this movement has been completed and while rack-bar 81 held at the extreme of its outward movement cam 70 again swings frame 72 outward, and frame 19 is slightly elevated by its cam 25 to permit rotation of head 17 under the influence of cam 43 to the position designated by one of the gages 30, after which the frame 19 is again lowered and frame 72 swung back to engage the wheels 74 with the selected die-case, and cam 84 retracts rack-bar 81, thereby reversing the motion of wheels 74 and transferring the die-case to its carriage, after which cam 70 again swings frame 72 outward and frame 19 is elevated, thus completing the cycle. The several cams are united to rotate in unison and the cam-cylinder thus formed is loose upon shaft 26, the latter being connected to the driven cam-shaft of the casting-machine through a gear-train 85 by which the speed of shaft 26 is diminished to about one-fifth or other desired proportion of the driven cam-shaft.

Shaft 26 has secured thereto one member of a clutch in the form of a ratchet-wheel 86, Fig. 13, in position to be engaged with an opposing clutch-section in the form of a pawl 87, carried by the cam-cylinder. This pawl is provided with a spring 88 tending to engage it with the driving ratchet-wheel 86, and it is held therefrom by a shoulder 89 on a lever 90 engaging the tail of the pawl. The lever 90 is furnished with a second shoulder 91 in position to engage a pin 92, carried by the cam-cylinder for preventing back motion of the latter. Lever 90 is held normally by a spring with its shoulder 89 in engagement with pawl 87 to hold the latter removed from the driving ratchet-wheel 86 and its shoulder 91 behind pin 92 to prevent retrograde movement or displacement. By a movement of lever 90 in a direction to withdraw shoulder 89 from pawl 87 the latter is released and immediately caused to engage ratchet-wheel 86, thus putting in motion the cam-cylinder, and the latter continues in action until upon the completion of one revolution pawl 87 re-engages shoulder 89 and is thereby withdrawn from the ratchet-wheel.

Figure 16:
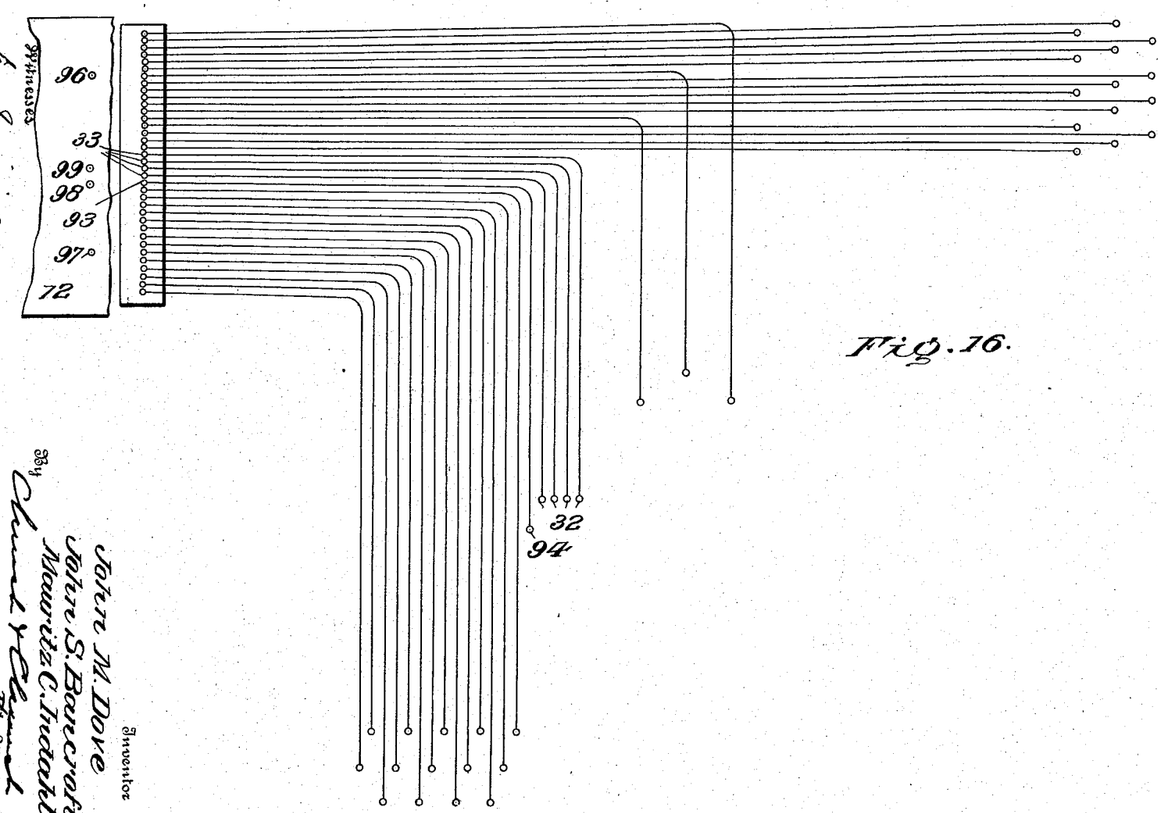
Fig. 16 is a diagrammatic view showing the pneumatic control system and a section of the record-strip.

The starting of the attachment into action by coupling the actuating devices with the driving mechanism is controlled from the record-strip through the medium of a port 93, Fig. 16, in the paper-feed mechanism communicating with a cylinder 94, wherein operates a piston 95, connected to lever 90, so that whenever a perforation in the record-strip is brought opposite said port the transposing mechanism will be set in action. The pressure in cylinder 94 is relieved before a complete cycle of movements of the die-case-transposing mechanism has been performed by the return of block 51 and consequent unlocking of the paper-feed mechanism in advance of the arrival of pawl 87 opposite shoulder 89 on lever 90, so that the latter will return to engaging position when the record-strip is advanced during the last revolution of the main driving-shaft.

In order that this attachment may operate in harmony with the casting-machine to which it is shown applied, it is requisite that the die-case and its carrier should occupy a fixed predetermined position at the time the transfer of die-cases is to be effected, and this may be attained by associating with the starting and gaging perforations the necessary positioning-perforations for acting, through the centering mechanism, to locate the die-case and its carrier in the desired positions. Thus in the diagrammatic view, Fig. 16, the signal for the transfer of die-cases is composed of two positioning-perforations 96 97, pertaining to the die-case-centering mechanism, a starting-perforation 98, and a die-case-selecting perforation 99. After the last type designated by the signal preceding the die-case-transfer signal has been cast and while the transfer of die-cases is being effected the action of the pump should be suspended to prevent the injection of molten metal into the uncovered mold.

Figure 1:
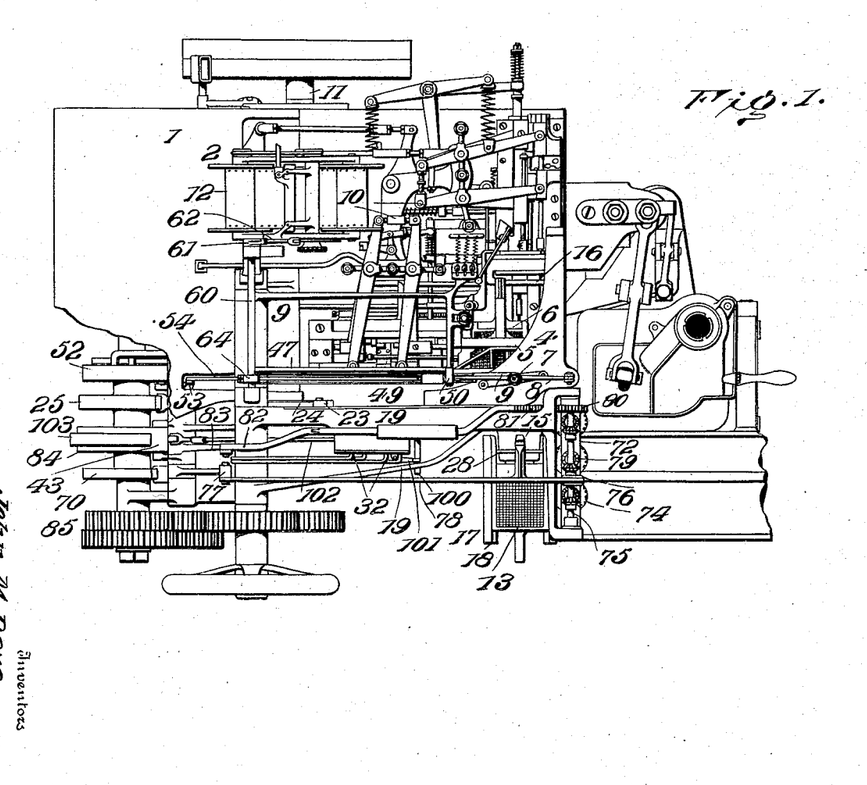
Figure 1 is a top plan view of a casting-machine, showing the application thereto of the die-case-transposing mechanism.
Figure 2:
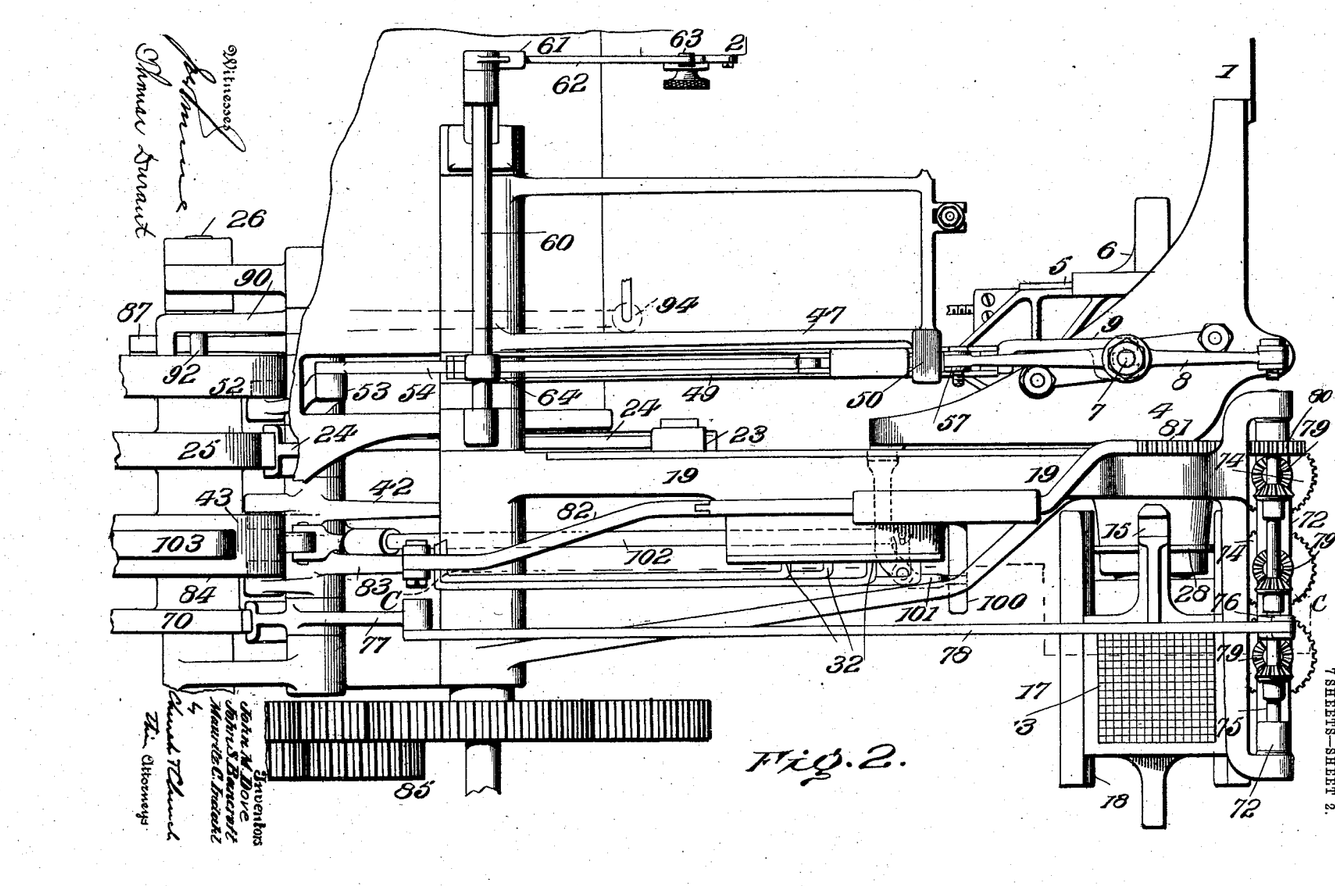
Fig. 2 is a top plan view of the transposing mechanism shown on an enlarged scale.

A lock-out mechanism suitable for the purpose and adapted to the pump-actuating devices of the prior patent is indicated in Figs. 2 and 3, wherein the pump-disengaging rod 100 (numbered 240 in the prior patent) is engaged by a bell-crank lever 101, attached to a rod 102, extending back to a cam 103, the latter serving to move rod 100 in a direction to disconnect the pump and to so hold it until just before the cam-sleeve completes its rotation.

A full and clear understanding of the general operation of the die-case-transfer mechanism will be found in the following brief summary of the cycle of operations as produced and controlled by the cams 25, 43, 52, 70, 84, and 103. When the casting-machine is in operation, the die-case-transposing mechanism is at rest with its magazine sustained in elevated position and the cam-cylinder disconnected from its driving-shaft. At this time the lower set of guides are empty, the die-case belonging thereto having been transferred to the die-case carrier, and the magazine is locked in position by the engagement of the jaws 34 35 with projection 46 and the gage-pin 30 corresponding with the die-case at the time in the carrier, for which purpose the cam 43 is properly shaped to hold pinion 39 in advanced position, with the coupling 41$^\times$ under sufficient compression to maintain the jaws in closed position, while the magazine is elevated. The die-case-transfer signal for bringing the transfer mechanism into operation is formed by the compositor at the keyboard-perforator, who designates the particular die-case to be used for succeeding characters by forming the four perforations constituting the transposition-signal in the record-strip—two for positioning the die-case and its carrier, one for starting the transfer mechanism and another for designating which one of the die-cases is to be used for the next succeeding character represented in the record-strip. When this transfer-signal arrives beneath the air-bar and the latter is depressed, pressure is admitted to the ports uncovered by the perforations. The main driving-shaft continuing in motion, the type previously designated is cast, the stop-pins of the primary gages of the die-case-centering mechanism are set, starting-lever 90 is operated to connect the cam-cylinder to its driving-shaft 26, and pressure is admitted to the cylinder of the gage 30 designating the die-case which is to be next used. At the time the newly-designated gage 30 cannot advance, as jaws 34 35 are closed, and it is not until later, when they open, that it takes its place between them. The cam-cylinder having been started in motion, but at a slower rate of speed than the main drive-shaft, cam 25 lowers the magazine 17; but before this is fully accomplished the centering mechanism has brought the die-case and its carrier to the position indicated by the two positioning-perforations, and cam 52 has withdrawn block 51 to elevate the die-case and its carrier and lock the feeding devices and air-bar in position. Immediately the magazine engages the alining projection on the carrier cam 43 operates to open jaws 34 35, allowing the gage 30 previously held between them to retract and the gage under pressure to advance, and at the same time shortly thereafter cam 70 operates to swing the gear-frame inward, bringing the first gear-wheel into mesh with the teeth on the die-case at the time in its carrier. Cam 84 next operates to advance rack 81, thereby rotating the wheels in a direction to withdraw the die-case from its carrier and deposit it in the empty berth in the magazine. Thereafter cam 25 raises frame 19 sufficiently to cause the magazine to clear the mechanism below it and cam 70 again swings the gear-frame outward. This releases the magazine, so that it is free to rotate, whereupon cam 43 closes the jaws upon the gage 30 and swings head 17 to the new position. Frame 19 is again lowered through the medium of cam 25 and the gear-frame swung inward by cam 70 to engage the wheels with the selected die-case, after which cam 84 retracts rack-bar 81, rotating the wheels in the opposite direction and transferring the die-case from the magazine to its carrier. The transposition of die-cases having thus been completed cam 52 advances block 51 to lower the new die-case into engagement with its centering mechanism, connect up the two sections of the centering-pin lever, and release the paper-feed mechanism, while cam 25 elevates the magazine and cam 70 swings the the gear-frame outward. After the paper-feed lock has been withdrawn and before the magazine is fully elevated the paper-feed mechanism operates to advance the record-strip, thereby releasing the starting-lever and permitting it to resume its position in the path of pawl 87, so that as the latter continues to advance it will be engaged and withdrawn from the driving member of the clutch and the cam-cylinder brought to rest, thereby completing a cycle of operations as performed by the die-case-transposing mechanism.

Viewed in its practical and commercial aspects the importance and advantages of an automatic die-case-transposing system of this kind will be apparent when it is considered that the number of characters or matrices thus placed at the disposal and under the direct control of the compositor increases with the addition of each die-case in proportion to the number of characters or matrices contained therein. Thus in the example given, wherein provision is made for the interchange of four die-cases of two hundred and twenty-five matrices each, the number of matrices subject to the direct control of the compositor is increased from two hundred and twenty-five to nine hundred. It is obvious, moreover, that the capacity of the attachment can be increased or diminished to accommodate any desired number of die-cases; but in the majority of cases two interchangeable die-cases with an aggregate capacity of four hundred and fifty matrices will suffice.

We believe ourselves to be the first to provide a type-casting machine with a plurality of interchangeable die-cases and automatic means for selectively coupling individual die-cases with the centering or positioning mechanism and to control the selection and coupling of the die-cases through the medium of a record-strip. Hence we wish it clearly understood that our invention is not limited to the particular apparatus herein described, as the latter represents but a preferred form of embodiment illustrative of the principle involved.

Having thus described our invention, what we claim as new, and desire to secure by Letters Patent, is—

1. A machine such as described provided with type-casting and die-case centering or adjusting mechanisms, a plurality of interchangeable die-cases, and means for selectively connecting individual die-cases with the centering or adjusting mechanism.

2. A machine such as described provided with type-casting and die-case-centering mechanisms, a plurality of interchangeable die-cases automatic means for selectively coupling the die-cases with the centering mechanism, and a record-strip controlling said selective coupling means.

3. In a type-casting machine such as described, the combination with its type-casting and die-case adjusting or centering mechanisms, of a magazine containing a plurality of die-cases and automatic means for effecting an exchange of die-cases between the magazine and the adjusting or centering mechanism, to bring any die-case into operation relative to the mold.

4. In a type-casting machine, such as described, the combination with its mold, die-case centering or adjusting mechanism and controlling record-strip, of a plurality of die-cases, and means controlled from the record-strip for selecting and coupling the die-cases with the adjusting or centering mechanism.

5. In a type-casting machine such as described the combination with its mold, centering or adjusting mechanism, die-case coupled with said centering or adjusting mechanism, and record-strip, of a detached die-case and means for automatically substituting one die-case for the other with relation to the centering or adjusting mechanism.

6. In a type-casting machine such as described the combination with its mold, centering or adjusting mechanism, a die-case coupled with said centering or adjusting mechanism and a record-strip, of a plurality of die-cases, means controlled by the record-strip for selectively designating a particular die-case and means for effecting the removal of the die-case at the time coupled with the adjusting or centering mechanism and substituting the designated die-case therefor.

7. In a type-casting machine such as described, the combination of the following elements, to wit: a mold; a centering or adjusting mechanism; a die-case coupled with said centering or adjusting mechanism; a plurality of die-cases; means for uncoupling and removing the die-case from its centering or adjusting mechanism; and means for selectively coupling any one of the die-cases with the centering or adjusting mechanism.

8. In a type-machine such as described, the combination of the following elements, to wit: a die-case centering or adjusting mechanism; a controlling record-strip; a plurality of die-cases; and means controlled by the record-strip for coupling any die-case with the centering or adjusting mechanism.

9. In a type-casting machine such as described, the combination with the die-case centering or adjusting mechanism, of a magazine or holder provided with a plurality of die-cases and means controlled from a record-strip for automatically selecting any die-case and coupling it with the centering or adjusting mechanism.

10. In a type-casting machine such as described, the combination of the following elements, to wit: a die-case-adjusting mechanism; a plurality of interchangeable die-cases; means for selectively designating different die-cases; means for coupling the selected die-case with the adjusting mechanism; and a record-strip controlling said die-case selective and coupling means.

11. In a type-casting machine such as described the combination of the following elements, to wit: a die-case adjusting or centering mechanism; a magazine or holder provided with a plurality of receptacles or guides each containing a die-case; means for shifting the magazine to present successive receptacles in position to deliver to the die-case adjusting or centering mechanism; translating devices for shifting the selected die-case from the magazine to the centering or adjusting mechanism and vice versa; a record-strip; and means controlled by the record-strip for positioning the magazine.

12. In a type-casting machine such as described, the combination with its type-casting and die-case centering or adjusting mechanisms and a controlling record-strip, of a die-case-transposing mechanism controlled by the record-strip and provided with a plurality of die-cases, selective means for presenting successive die-cases, and translating devices for shifting the selected die-case to the centering or adjusting mechanism and withdrawing it therefrom.

13. In a type-casting machine such as described the combination with its type-casting and die-case centering or adjusting mechanisms and the controlling record-strip therefor, of a die-case-transposing attachment controlled by the record-strip and provided with a plurality of die-case guides or receptacles, means for successively presenting said guides or receptacles in position to receive or deliver the die-case pertaining thereto, translating devices for shifting the die-case relatively to the centering or adjusting mechanism; and means for coupling and uncoupling the die-case and the adjusting or centering mechanism.

14. In a type-casting machine, such as described the combination with its die-case carrier or support and the centering or adjusting mechanism for moving the die-case on said carrier, of a die-case-transposing device or mechanism provided with a plurality of interchangeable die-cases, means for presenting individual die-cases to the carrier, translating devices for delivering the selected die-case to the carrier and withdrawing it therefrom, and means for shifting the carrier to couple and uncouple the die-case and its centering or adjusting mechanism.

15. In a type-casting machine such as described the combination with its mold, die-case centering or adjusting mechanism, the support on which the die-case reciprocates when connected to its centering or adjusting mechanism and the plunger for seating the selected matrix, of a die-case-transposing mechanism provided with a plurality of guides and die-cases mounted thereon, selective means for presenting different die-cases opposite the carrier or support, translating devices for shifting the selected die-case, and means for automatically shifting the die-case support or carrier, to couple and uncouple the die-case mounted therein with the centering or adjusting mechanism.

16. In a type-casting machine such as described the combination with its mold, movable die-case carrier provided with guides for the die-case, centering or adjusting mechanisms connected to the carrier and die-case respectively, and record-strip controlling said centering mechanisms, of a transposing die-case attachment provided with a plurality of die-cases, means controlled from the record-strip for selecting a die-case for application to the carrier, and means also controlled from the record-strip for moving the carrier, to couple or uncouple the die-case thereon with its centering or adjusting mechanism.

17. In a type-casting machine such as described, the combination with the die-case centering or adjusting mechanism and the die-case carrier the latter provided with guides for the die-case and supported to move toward and from the centering or adjusting mechanism, to couple and uncouple the die-case, of an actuating lever or member for the die-case carrier comprising driving and driven members and a lock or coupling for connecting or disconnecting said members.

18. In a type-casting machine such as described, the combination with the die-case centering or adjusting mechanism and the die-case, its carrier and the movable support therefor, of an actuating member or lever for the die-case support comprising relatively movable section and a lock.

19. In a type-casting machine such as described the combination with the die-case-centering mechanism, the die-case, its carrier and support, and the matrix-seating plunger, of an actuating member or lever comprising driving and driven members, the latter coupled with the die-case support, a lock for connecting said members for simultaneous action, and a connection coupled with the matrix-seating plunger and controlled by said lock.

20. In a type-casting machine such as described, the combination with the die-case centering or adjusting mechanism, the die-case, its carrier and support and the matrix-seating plunger with its lever, of an actuating member or lever comprising two sections the one constituting the driving and the other a driven member, the latter engaging the matrix-seating plunger and connected to the die-case support through a relatively movable member, and a lock for rigidly uniting the two members and said movable member, to cause them to operate in unison when casting, said lock, when withdrawn, engaging said movable member to elevate the die-case carrier and disconnect it and the driven member from the driving member.

21. In a type-casting machine such as described, the combination with the matrix-seating plunger and the lever connected to the die-case carrier-support, of the actuating-lever provided with two independently-movable sections of which one section is coupled with the matrix-seating plunger and carries a pivoted member connected with the die-case-carrier-support lever while the other or driving section is provided with an open bearing embracing the driven section and the pivoted member thereon, a locking-block adapted to enter the open bearing and hold the driven section and pivoted member in fixed relation to the driving member.

22. In a type-casting machine such as described, the combination with the movable support for the die-case and the reciprocating matrix-seating plunger of an actuating device or mechanism therefor including a driving member, a driven member capable of independent motion between shoulders or abutments on the driving member and connected to said plunger, a lever coupled to said support and pivotally mounted upon the driven member and extending between the shoulders or abutments on the driving member, and a block or interponent supported upon the driving member in position to enter between one abutment or shoulder on the driving member and the driven member and the lever carried thereby to lock these parts in fixed relation, said block or interponent when retracted engaging the lever to move the latter in a direction to elevate the die-case support.

23. In a type-casting machine such as described, the combination with the movable die-case support and the seating-plunger, of an actuating-lever comprising two sections of which the driven section is connected to the plunger and arranged to vibrate independently of the driving member between shoulders carried by the latter, a three-armed lever pivoted upon the driven section and having one of its arms extended between the shoulders on the driving member and connected to the die-case-supporting devices, a block movable in one direction to enter between the driving and driven members and engaging one arm of the lever, to lock the parts together, and when moved in the opposite direction, to permit independent movement of the two members, engaging another arm of the lever to move it in a direction to elevate the die-case support and to engage the frame so as to support the driven member.

24. In a type-casting machine such as described the combination with the die-case carrier of a revoluble die-case magazine or holder provided with a plurality of receptacles or guides, a record-strip, and means controlled thereby for selectively positioning the receptacles or guides opposite the carrier.

25. In a type-casting machine such as described, provided with a die-case and carrier movable in relatively transverse directions, a centering or adjusting mechanism therefor and a controlling record-strip for said centering mechanism, and in combination therewith a revoluble magazine or holder provided with a plurality of die-cases supported in receptacles or guides, and means for rotating said magazine directly from one position of adjustment to another, to present different die-cases opposite the carrier.

26. In a type-casting machine such as described, provided with a die-case and carrier whose positions relatively to each other and the mold are determined by a centering mechanism controlled by a record-strip, and in combination therewith, a revoluble magazine or head provided with a plurality of receptacles or guides, actuating devices for rotating said magazine or head, to present different receptacles or guides opposite the carrier, and mechanism controlled by the record-strip and operating upon the actuating devices to determine the extent and direction of movement communicated to the magazine or holder.

27. In a type-casting machine such as described, provided with movable die-case and carrier, a centering or adjusting mechanism therefor, and a controlling record-strip, and in combination therewith, the following elements, to wit: a revoluble magazine provided with a plurality of die-cases and guides or receptacles therefor; actuating devices for rotating said magazine in either direction; and means controlled from the record-strip for determining the direction and extent of motion communicated by said actuating devices.

28. In a type-casting machine such as described, the combination with the die-case carrier and the centering mechanism, of means for elevating the carrier, a die-case magazine movable laterally of the carrier, and means for effecting registry between the magazine and carrier.

29. In a type-casting machine such as described the combination with the die-case carrier and the centering mechanism, of a revoluble die-case magazine provided with a plurality of receptacles or guides, and registering devices intermediate the carrier and magazine for alining the guides or receptacles with the carrier.

30. In a type-casting machine such as described, the combination with the die-case carrier, and centering mechanism of a revoluble magazine provided with a plurality of die-case guides or receptacles and supported to reciprocate laterally of the carrier, means for rotating and reciprocating said magazine to present different guides or receptacles opposite the carrier, and interlocking members on the magazine support and carrier.

31. In a type-casting machine such as described the combination of the following elements, to wit: a reciprocatory carrier provided with guides for a die-case; a die-case mounted on said carrier; a centering or adjusting mechanism coupled with the die-case and with the carrier; means for moving the carrier to couple or uncouple the die-case and its centering mechanism; a revoluble magazine provided with a plurality of die-case receptacles and one or more die-cases; and a reversing translating mechanism for shifting the die-cases from carrier to magazine and vice versa.

32. In a type-casting machine such as described, the combination of the following elements to wit: a reciprocatory carrier; a die-case supported to reciprocate upon said carrier; centering mechanism engaging both the die-case and carrier; means for coupling and uncoupling the die-case and its centering mechanism; a magazine provided with a plurality of die-case receptacles and movable to bring any receptacle opposite the carrier, one or more of said receptacles being provided with a die-case; a reversing translating device for the die-cases; and means for automatically controlling the action of said elements to effect the uncoupling of the die-case in the carrier and its transfer to the magazine, the shifting of the magazine to bring a selected die-case to position, the transfer of the selected die-case to the carrier and the coupling of said die-case to the centering mechanism.

33. In a die-case-transposing device for type-casting machines such as described the combination of the following elements to wit: a revoluble magazine provided with a plurality of die-case receptacles; actuating devices for the magazine including a reciprocatory member; a pair of oppositely-movable jaws controlling the position of said reciprocatory member; and a plurality of gages for determining the successive closed position of said jaws.

34. In a die-case-transposing device for type-casting machines such as described the combination of the following elements, to wit: a movable magazine equipped with a plurality of die-case receptacles or guides; actuating devices therefor including a reciprocatory member; oppositely-movable jaws for positioning said reciprocatory member; and gaging devices for determining successive closed position for the jaws.

35. In a die-case-transposing device for type-casting machines such as described the combination of the following elements to wit: a magazine provided with a plurality of die-case receptacles and movable to bring any one of said receptacles to the delivery-point; actuating devices for shifting said magazine provided with a reciprocatory element; a pair of oppositely-movable jaws embracing said reciprocatory element within their line of movement; and a plurality of gages serially disposed in the line of movement of the jaws and adapted to be projected into the path of the latter to determine successive closing positions.

36. A magazine adjusting or positioning mechanism for type-casting machines such as described comprising the following elements in combination, to wit: a movable magazine provided with a plurality of die-case receptacles; actuating devices including a reciprocatory member for adjusting the magazine to bring different receptacles to a common station; a pair of oppositely-movable jaws; a plurality of gages serially disposed between and in the path of said jaws; and a record-strip controlling said gages.

37. In a magazine adjusting or positioning mechanism for type-casting machines such as described the combination of the following elements, to wit: a magazine provided with a plurality of die-case receptacles and movable to bring any one of said receptacles to a common point; oppositely-movable jaws; a plurality of gages for determining successive closing positions for said jaws; and an actuating mechanism for shifting the magazine provided with a reciprocatory member extending between and acted upon by said jaws.

38. In a type-casting machine such as described, the combination of the following elements, to wit: a type-casting and matrix-centering mechanism including relatively movable die-case and carrier and centering mechanism therefor; a die-case-transposing mechanism including a movable magazine with a plurality of die-case receptacles and one or more die-cases; a magazine-shifting mechanism; die-case-translating devices; an actuating mechanism for the magazine-shifting and die-case-translating devices; gages controlling the magazine-shifting devices; and a record-strip controlling said actuating mechanism and said gages.

39. In a type-casting machine, such as described the combination with the type-casting and die-case-centering mechanism and the controlling record-strip therefor, of the following elements, to wit: a movable magazine equipped with a plurality of die-cases; a die-case selecting or designating mechanism controlled from said record-strip; magazine-shifting devices controlled by said selecting or designating mechanism; die-case-translating devices; and actuating devices for the shifting and translating devices coupled with the main driving-shaft through a clutch, the latter controlled from the record-strip.

40. In a type-casting machine such as described, the combination with the paper-feed mechanism, centering mechanism and die-case carrier, of means for shifting the carrier relatively to the centering mechanism, to uncouple or couple the die-case with the latter, and for locking the paper-feed devices.

41. In a type-casting machine such as described, the combination with the paper-feed mechanism, centering mechanism and die-case carrier, of means for shifting the carrier relatively to the centering mechanism including a connection with the paper-feed lock-out and the air-bar, for arresting the feed and admitting pressure to the control system when the die-case is uncoupled from the centering mechanism.

42. In a type-casting machine such as described, the combination with the paper-feed mechanism and its air-bar, of means coupled with the lock-out of the paper-feeding devices for holding down the air-bar.

43. In a type-casting machine such as described, the combination with the paper-feed mechanism and its air-bar of a link coupled with the lock-out lever and engaging the air-bar to hold the latter in operative position when the feeding action is suspended.

44. In a type-casting machine such as described, the combination with the die-case-carrier support the sectional actuating-lever and the paper-feed, of the lock for said lever-sections a link connected to the lock-out of the paper-feed and actuating devices connected to said lock and link.

45. In a casting-machine such as described, provided with a paper-feed mechanism and die-case carrier mounted upon a movable support, of an actuating device for the carrier-support comprising two relatively movable sections, a lock for detachably connecting said sections, and a lock-out for the paper-feed coupled with said lock.

46. In a casting-machine such as described the combination with the movable support for the die-case carrier and its actuating device comprising relatively movable sections, of a locking device for uniting said sections, and means controlled by said locking device for moving one section relatively to the other when the locking device is retracted to uncouple the two sections.

47. In a type-casting machine such as described the combination with the movable die-case-carrier support and its two-part actuating-lever of the reciprocating block for connecting and disconnecting the sections of the lever, means engaged by said block when retracted for separating the sections of the lever, to elevate the carrier, a lock-out for the paper-feed coupled with said block and means for engaging and holding down the air-bar also coupled with the block to operate in conjunction therewith.

48. In a type-casting machine, such as described, the combination of the following elements, to wit: a type-casting mechanism provided with a reciprocatory carrier, a die-case mounted thereon, centering mechanism connected to said carrier and die-case, respectively, and a record-strip controlling said centering mechanism; a record-strip-feeding mechanism provided with a lock-out for suspending the action of the feeding devices and an air-bar; and actuating devices for simultaneously uncoupling the die-case from its centering mechanism, holding down the air-bar and operating the paper-feed lock-out.

49. As a means for controlling the action of a type-casting machine equipped with interchangeable die-cases and a transposing mechanism such as described a record-strip containing in addition to the usual signals a special die-case-designating signal operative upon the transposing mechanism to couple the selected die-case with the adjusting devices of the casting-machine.

50. A record-strip or controller for type-casting machines, such as described provided in addition to the usual matrix-designating signals a special die-case selecting and transposing signal.

51. In a die-case-transposing mechanism for type-casting machines such as described the combination of the following elements to wit: a reciprocatory frame; a revoluble magazine mounted on said frame; and a translating mechanism also mounted on said frame and provided with die-case-engaging devices movable laterally of the magazine.

52. In a type-casting machine such as described, the combination with the die-case carrier, of a frame movable laterally of the carrier, a revoluble magazine supported on said frame, and translating devices carried on said frame and movable laterally of the magazine.

53. In a type-casting machine such as described the combination with the die-case carrier of a frame movable laterally of said carrier, a magazine mounted on said frame and movable thereon to present different die-case receptacles opposite the carrier, and a translating mechanism movable laterally of the carrier, to engage a die-case in the magazine or carrier.

54. In a type-casting machine such as described the combination of the following elements, to wit: a type-casting and die-case-centering mechanism including a reciprocatory die-case carrier; automatic means for coupling and uncoupling the die-case and its centering devices; a magazine provided with a plurality of die-cases and receptacles therefor; automatic actuating devices for shifting the magazine to bring different receptacles into alinement with the carrier; selective devices for designating the receptacles so brought into alinement; and translating devices for engaging a die-case when in the carrier or the receptacle in alinement therewith.

55. In a type-casting machine such as described the combination of the following elements, to wit: a die-case-centering mechanism provided with a reciprocatory carrier; means for automatically coupling and uncoupling the die-case and its centering mechanism; a magazine provided with a plurality of die-cases and receptacles therefor; means for shifting the magazine to present different receptacles opposite the carrier; automatic die-case-selecting mechanism controlling the position of the magazine; and translating devices in coöperative relation with the carrier and the magazine-receptacle in alinement therewith.

56. In a type-casting machine such as described the combination of the following elements, to wit: a centering mechanism provided with a reciprocatory die-case carrier; means for coupling and uncoupling the die-case and its centering devices; a magazine provided with a plurality of die-cases and receptacles therefor; means for shifting the magazine to present different receptacles in alinement with the carrier; automatic selecting devices for positioning the magazine; translating devices in coöperative relation with the carrier and the magazine-receptacle in alinement therewith; actuating mechanism for the die-case coupling and uncoupling devices the magazine-shifting mechanism and the translating mechanism provided with starting and stopping devices; and a record-strip controlling the selecting devices for positioning the magazine and the starting devices for the actuating mechanism.

57. In a die-case-transposing mechanism for type-casting machines such as described the combination of the following elements, to wit: a revoluble magazine provided with guides for the reception of a die-case; a die-case mounted in said guides and provided with a notch; and a flange engaging said notch to retain the die-case.

58. In a die-case-transposing mechanism for type-casting machines such as described the combination of the following elements, to wit: a revoluble magazine provided with a plurality of guides; a plurality of die-cases each provided with a retaining-notch mounted in said guides; a fixed flange engaging the notches and provided with a gate for the passage of the guides or other parts in which said notches are formed.

59. In a die-case-transposing mechanism such as described the combination of the following elements to wit: a revoluble magazine; a plurality of die-cases supported on guides on said magazine; a fixed flange with open gate, for receiving and engaging the die-cases; and means for positioning the magazine with any set of guides in alinement with said gate.

60. As a new article of manufacture a die-case provided with teeth along one edge for engagement with the translating devices of a die-case-transposing mechanism such as described.

61. As a new article of manufacture a die-case such as described provided with teeth along one edge and a notch in its central guide.

JOHN MAURY DOVE.
JOHN SELLERS BANCROFT.
MAURITZ C. INDAHL.

Witnesses:
MORTIMER A. JONES,
JOELLY CLEMMER.